US012470888B2

(12) United States Patent
Breebaart et al.

(10) Patent No.: US 12,470,888 B2
(45) Date of Patent: *Nov. 11, 2025

(54) SPATIAL AUDIO SIGNAL MANIPULATION

(71) Applicants: Dolby Laboratories Licensing Corporation, San Francisco, CA (US); DOLBY INTERNATIONAL AB, Dublin (IE)

(72) Inventors: Dirk Jeroen Breebaart, Ultimo (AU); Antonio Mateos Sole, Barcelona (ES); Heiko Purnhagen, Sundbyberg (SE); Nicolas R. Tsingos, San Francisco, CA (US)

(73) Assignees: Dolby Laboratories Licensing Corporation, San Francisco, CA (US); DOLBY INTERNATIONAL AB, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/607,347

(22) Filed: Mar. 15, 2024

(65) Prior Publication Data

US 2024/0305945 A1 Sep. 12, 2024

Related U.S. Application Data

(60) Continuation of application No. 17/694,506, filed on Mar. 14, 2022, now Pat. No. 11,943,605, which is a (Continued)

(30) Foreign Application Priority Data

Apr. 21, 2015 (ES) ................................ ES201530531
Jul. 6, 2015 (EP) .................................... 15175433

(51) Int. Cl.
*H04S 7/00* (2006.01)
*H04R 5/02* (2006.01)
*H04S 3/00* (2006.01)

(52) U.S. Cl.
CPC ............... *H04S 7/303* (2013.01); *H04R 5/02* (2013.01); *H04S 3/008* (2013.01); *H04S 7/30* (2013.01);
(Continued)

(58) Field of Classification Search
CPC . H04S 7/303; H04S 3/008; H04S 7/30; H04S 2400/11; H04S 2420/03; H04R 5/02
See application file for complete search history.

(56) References Cited

U.S. PATENT DOCUMENTS 8,351,612 B2 1/2013 Yoo
8,363,865 B1 1/2013 Bottum
(Continued)

FOREIGN PATENT DOCUMENTS

WO 2008/115284 9/2008
WO 2010006719 1/2010
(Continued)

OTHER PUBLICATIONS

Breebaart, Jeroen "Comparison of Interaural Intensity Differences Evoked by Real and Phantom Sources" J. Audio Eng. Soc., vol. 61, No. 11, Nov. 2013, pp. 850-859.
(Continued)

*Primary Examiner* — Andrew Sniezek

(57) ABSTRACT

Described herein is a method (30) of rendering an audio signal (17) for playback in an audio environment (27) defined by a target loudspeaker system (23), the audio signal (17) including audio data relating to an audio object and associated position data indicative of an object position. Method (30) includes the initial step (31) of receiving the
(Continued)

audio signal (17). At step (32) loudspeaker layout data for the target loudspeaker system (23) is received. At step (33) control data is received that is indicative of a position modification to be applied to the audio object in the audio environment (27). At step (38) in response to the position data, loudspeaker layout data and control data, rendering modification data is generated. Finally, at step (39) the audio signal (17) is rendered with the rendering modification data to output the audio signal (17) with the audio object at a modified object position that is between loudspeakers within the audio environment (27).

9 Claims, 9 Drawing Sheets

Related U.S. Application Data continuation of application No. 16/938,561, filed on Jul. 24, 2020, now Pat. No. 11,277,707, which is a division of application No. 16/374,520, filed on Apr. 3, 2019, now Pat. No. 10,728,687, which is a division of application No. 15/567,908, filed as application No. PCT/US2016/028501 on Apr. 20, 2016, now Pat. No. 10,257,636.

(60) Provisional application No. 62/183,541, filed on Jun. 23, 2015.

(52) U.S. Cl.
CPC ....... *H04S 2400/11* (2013.01); *H04S 2420/03* (2013.01)

(56) References Cited

U.S. PATENT DOCUMENTS

| | | | | |
|---|---|---|---|---|
| 10,257,636 | B2 | 4/2019 | Breebaart | |
| 10,728,687 | B2 | 7/2020 | Breebaart | |
| 11,277,707 | B2 | 3/2022 | Breebaart | |
| 11,943,605 | B2 * | 3/2024 | Breebaart | H04R 5/02 |
| 2013/0236039 | A1 | 9/2013 | Jax | |
| 2013/0329922 | A1 | 12/2013 | Lemieux | |
| 2014/0133682 | A1 | 5/2014 | Chabanne | |
| 2018/0007483 | A1 | 1/2018 | Chon | |

FOREIGN PATENT DOCUMENTS

| | | | |
|---|---|---|---|
| WO | 2013006338 | A2 | 1/2013 |
| WO | 2013/143934 | | 10/2013 |
| WO | 2013192111 | | 12/2013 |
| WO | 2014/035728 | | 3/2014 |
| WO | 2014036121 | | 3/2014 |
| WO | 2014/184353 | | 11/2014 |
| WO | 2016/066705 | | 5/2016 |

OTHER PUBLICATIONS

ITU-R Recommendation ITU-R BS. 1116-1 “Methods for the Subjective Assessment of Small Impairments in Audio Systems Including Multichannel Sound Systems” International Telecom Union, Geneva, Switzerland, (1994-1997).

Plogsties, J. et al “Object Interaction Use Cases and Technology” ISO/IEC JTC1/SC29/WG11 MPEG 2014, Mar. 2014, Valencia, Spain.

Pulkki, Ville “Compensating Displacement of Amplitude-Panned Virtual Sources” Audio Engineering Society, 22nd International Conference, Synthetic and Entertainment Audio, pp. 186-195, Espoo, Finland, 2002.

* cited by examiner

SPATIAL AUDIO SIGNAL MANIPULATION

CROSS-REFERENCE TO RELATED APPLICATIONS

This application is a continuation of U.S. patent application Ser. No. 17/694,506, filed Mar. 14, 2024, which is a continuation of U.S. patent application Ser. No. 16/938,561, filed Jul. 24, 2020 (now U.S. Pat. No. 11,277,707), which is a divisional of U.S. patent application Ser. No. 16/374,520, filed on Apr. 3, 2019 (now U.S. Pat. No. 10,728,687), which is a divisional of U.S. patent application Ser. No. 15/567,908, filed on Oct. 19, 2017 (now U.S. Pat. No. 10,257,636), which is the U.S. national stage of International Patent Application No. PCT/US2016/028501 filed on Apr. 20, 2016, which in turn claims priority to Spanish Patent Application No. P201530531, filed on Apr. 21, 2015, U.S. Provisional Patent Application No. 62/183,541, filed on Jun. 23, 2015 and European Patent Application No. 15175433.0, filed on Jul. 6, 2015, each of which is incorporated herein by reference in its entirety.

TECHNOLOGY

The present Application relates to audio signal processing. More specifically, embodiments of the present invention relate to rendering audio objects in spatially encoded audio signals.

While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

The new Dolby Atmos™ cinema system introduced the concept of a hybrid audio authoring, a distribution and playback representation that includes both audio beds (audio channels, also referred to static objects) and dynamic audio objects. In the present description, the term 'audio objects' relates to particular components of a captured audio input that are spatially, spectrally or otherwise distinct. Audio objects often originate from different physical sources. Examples of audio objects include audio such as voices, instruments, music, ambience, background noise and other sound effects such as approaching cars.

In the Atmos™ system, audio beds (or static objects) refer to audio channels that are meant to be reproduced at predefined, fixed loudspeaker locations. Dynamic audio objects, on the other hand, refer to individual audio elements that may exist for a defined duration in time and have spatial information describing certain properties of the object, such as its intended position, the object size, information indicating a specific subset of loudspeakers to be enabled for reproduction of the dynamic objects, and alike. This additional information is referred to as object metadata and allows the authoring of audio content independent of the end-point loudspeaker setup, since dynamic objects are not linked to specific loudspeakers. Furthermore, object properties may change over time, and consequently metadata can be time varying.

Reproduction of hybrid audio requires a renderer to transform the object-based audio representation to loudspeaker signals. A renderer takes as inputs (1) the object audio signals, (2) the object metadata, (3) the end-point loudspeaker setup, indicating the locations of the loudspeakers, and outputs loudspeaker signals. The aim of the renderer is to produce loudspeaker signals that result in a perceived object location that is equal to the intended location as specified by the object metadata. In the case that no loudspeaker is available at the intended position, a so-called phantom image is created by panning the object across two or more loudspeakers in the vicinity of the intended object position. In mathematical form, a conventional renderer can be described by a set of time-varying panning gains $g_{i,j}(t)$ being applied to a set of object audio signals $x_j(t)$ to result in a set of loudspeaker signals $s_i(t)$:

$$s_i(t) = \sum_j g_{i,j}(t) x_j(t) \quad \text{(Eq 1)}$$

In this formulation, index i refers to a loudspeaker, and index j is the object index. The panning gains $g_{i,j}(t)$ result from the loudspeaker positions $P_i$ in the loudspeaker set P and time-varying object position metadata $M_j(t)$ $$M_j(t) = \begin{bmatrix} X_j(t) \\ Y_j(t) \\ Z_j(t) \end{bmatrix} \quad \text{(Eq 2)}$$

based on a panning law or panning function $\mathcal{F}$:

$$g_{i,j}(t) = \mathcal{F}(P, M_j(t)) \quad \text{(Eq 3)}$$

A wide range of methods of specifying $\mathcal{F}$ to compute panning gains for a given loudspeaker with index i and position $P_i$ have been proposed in the past. These include, but are not limited to, the sine-cosine panning law, the tangent panning law, and the sine panning law (cf. Breebaart, 2013 for an overview). Furthermore, multi-channel panning laws such as vector-based amplitude panning (VBAP) have been proposed for 3-dimensional panning (Pulkki, 2002).

Amplitude panning has shown to work well when applied to pair-wise panning across loudspeakers in the horizontal (left-right) plane that are symmetrically placed in terms of their azimuth. The maximum azimuth aperture angle between loudspeakers for panning to work well amounts to approximately 60 degrees, allowing a phantom image to be created between −30 and +30 degrees azimuth. Panning across loudspeakers lateral to the listener (front to rear in the listening frame), however, causes a variety of problems:

When the listener is not exactly positioned in a desired audio 'sweet spot', or whenever loudspeakers are not exactly delay aligned at the listener's position, combing artifacts will arise when an object is panned across two loudspeakers. This combing effect deteriorates the perceived timbre of the phantom source, and results in a collapse of the spaciousness of the overall scene. Moreover, small changes in the orientation and position of the head will cause comb-filter notches and peaks to shift in frequency. As a result, the sweet spot in a multi-channel loudspeaker setup is often small and the perceived timbre strongly depends on the head orientation and position. This is sometimes referred to as 'the rocking chair' problem.

In pair-wise panning using symmetrically-placed loudspeakers in front of the listener, the contribution of the two loudspeakers results in sound-source localization cues at the level of the listener's eardrums that closely correspond to those arising from the intended sound source location. This process does not work reliably for panning across loudspeakers in the front-to-rear direction. As a result, the perceived phantom source location can be ambiguous, or may be very different from the intended source location.

Downmixing of rendered audio content (for example from Dolby Digital 5.1—ATSC A/52 standard—to stereo) causes an increase in the audio level of audio objects that are panned across front and surround loudspeakers. This is caused by the fact that panning laws are typically energy preserving, i.e.:

$$1 = \sum_i g_{i,j}^2 \quad \text{(Eq 4)}$$

When the corresponding loudspeaker signals are downmixed electrically, a gain buildup will occur because for any gains $0 \le g_{i,j} \le 1$:

$$\sum_i g_{i,j} \ge \sqrt{\sum_i g_{i,j}^2} \quad \text{(Eq 5)}$$

The limitations of existing audio systems are particularly relevant for Dolby Digital 5.1 playback, and/or for loudspeaker configurations with 4 overhead loudspeakers such as 5.1.4 or 7.1.4. For such loudspeaker configurations, (dynamic) objects with metadata indicating a position in the middle of the room, or in the middle of the ceiling plane will typically be phantom-imaged between pair-wise remotely placed front and rear loudspeakers. Furthermore, side-surround channels may be produced as phantom images as well. An example of such phantom-imaging problem is visualized in FIG. 1, which illustrates a square room with four corner loudspeakers labeled 'Lf', 'Rf', 'Ls', and 'Rs', which are placed in the corners of the square room. A fifth center loudspeaker labeled 'C' is positioned directly in front of a listener's position (which corresponds roughly to the center of the room). An audio object with metadata coordinates (x=0, y=0.4) as depicted by the circle labeled 'object' is typically amplitude panned between loudspeakers labeled 'Lf' and 'Ls', as indicated by the arrows originating from 'object'. Furthermore, if the content comprises more than five channels, for example also comprising a right side-surround channel (dashed-line loudspeaker icon labeled 'Rss' in FIG. 1), the signal associated with that channel may be reproduced by loudspeakers labeled 'Rf' and 'Rs' to preserve the spatial intent of that particular channel.

Amplitude panning as depicted in FIG. 1 can be thought of as compromising timbre and sweet spot size against maintaining spatial artistic intent for sweet-spot listening.

Note that with a 7-channel loudspeaker setup (e.g. including 'Lss' and 'Rss' loudspeakers), the content depicted in FIG. 1 would have significantly less phantom-imaging applied. In particular, the 'Rss' channel would be reproduced by a dedicated 'Rss' loudspeaker, while the object at y=0.4 would be reproduced mostly by the 'Lss' loudspeaker, with only a small amount of leakage to the 'Lf' loudspeaker.

There is a desire to mitigate the limitations imposed by prior-art amplitude panning.

SUMMARY OF THE INVENTION

In accordance with a first aspect of the present invention there is provided a method of rendering an audio signal for playback in an audio environment defined by a target loudspeaker system, the audio signal including audio data relating to an audio object and associated position data indicative of an object position, the method including the steps of:

a. receiving the audio signal;
b. receiving loudspeaker layout data for the target loudspeaker system;
c. receiving control data indicative of a position modification to be applied to the audio object in the audio environment;
d. in response to the position data, loudspeaker layout data and control data, generating rendering modification data; and
e. rendering the audio signal with the rendering modification data to output the audio signal with the audio object at a modified object position that is between loudspeakers within the audio environment.

In one embodiment each loudspeaker in the loudspeaker system is driven with a drive signal and the rendering modification data includes a modified drive signal for one or more of the loudspeakers. In one embodiment the drive signal is a function of position data and the modified drive signal is generated by modifying the position data. In one embodiment the drive signal is a function of loudspeaker layout data and the modified drive function is generated by modifying the loudspeaker layout data. In one embodiment the drive signal is a function of a panning law and the modified drive function is generated by modifying the panning law.

In one embodiment the modified object position is in a front-rear direction within the audio environment. In one embodiment the modified object position is a position nearer to one or more loudspeakers in the audio environment than the object position. In one embodiment the modified object position is a position nearer to a closest loudspeaker in the audio environment relative to the object position.

In one embodiment the rendering is performed such that an azimuth angle of the audio object between the object position and modified object position from the perspective of a listener is substantially unchanged.

In one embodiment the audio environment includes a coordinate system and the position data and loudspeaker layout data includes coordinates in the coordinate system.

In one embodiment the control data determines a type of rendering modification data to be generated. In one embodiment the control data determines a degree of position modification to be applied to the audio object during the rendering of the audio signal.

In one embodiment the degree of position modification is dependent upon the loudspeaker layout data. Preferably the degree of position modification is dependent upon a number of surround loudspeakers in the target loudspeaker system.

In one embodiment the audio signal includes the control data. In one embodiment the control data is generated during an authoring of the audio signal.

In one embodiment the loudspeaker layout data includes data indicative of two surround loudspeakers. In another embodiment the loudspeaker layout data includes data indicative of four surround loudspeakers.

In accordance with a second aspect of the present invention there is provided a computer system configured to perform a method according to the first aspect.

In accordance with a third aspect of the present invention there is provided a computer program configured to perform a method according to the first aspect.

In accordance with a fourth aspect of the present invention there is provided a non-transitive carrier medium carrying computer executable code that, when executed on a processor, causes the processor to perform a method according to the first aspect.

In accordance with a fifth aspect of the present invention there is provided an audio content creation system including:

- an input for receiving audio data from one or more audio input devices, the audio data including data indicative of one or more audio objects;
- an audio processing module to process the audio data and, in response, generate an audio signal and associated metadata including object position data indicative of a spatial position of the one or more audio objects within a first audio environment; and
- a control module configured to generate rendering control data to control the performing of audio object position modification to be performed on the audio signal during rendering of that signal in a second audio environment.

In one embodiment the rendering control data includes an instruction to perform audio object position modification on a subset of the one or more audio objects. In one embodiment the rendering control data includes an instruction to perform audio object position modification on each of the one or more audio objects.

In one embodiment the object position modification is dependent upon a type of audio object.

In one embodiment the object position modification is dependent upon a position of the one or more objects in the second audio environment.

In one embodiment the rendering control data determines a type of object position modification to be performed.

In one embodiment the rendering control data determines a degree of object position modification to be applied to the one or more audio objects.

In one embodiment the rendering control data includes an instruction not to perform audio object position modification on any one of the audio objects.

In accordance with a sixth aspect of the present invention there is provided an audio rendering system including:

- an input configured to receive:
  - an audio signal including object audio data relating to one or more audio objects and associated object position data indicative of a spatial position of the one or more audio objects within a first audio environment;
  - loudspeaker layout data for a target loudspeaker system defining a second audio environment; and
  - rendering control data; and
- a rendering module configured to render the audio signal based on the rendering control data and, in response, output the audio signal in a second audio environment with the one or more audio objects at respective modified object positions within the second audio environment.

In one embodiment the modified object positions are between original object positions and a position of at least one loudspeaker in the second audio environment.

In accordance with a seventh aspect of the present invention there is provided an audio processing system including the audio content system according to the fifth aspect and the audio rendering system according to the sixth aspect.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

System Overview

The present invention relates to a system and method of rendering an audio signal for a reproduction audio environment defined by a target loudspeaker system.

Figure 1:
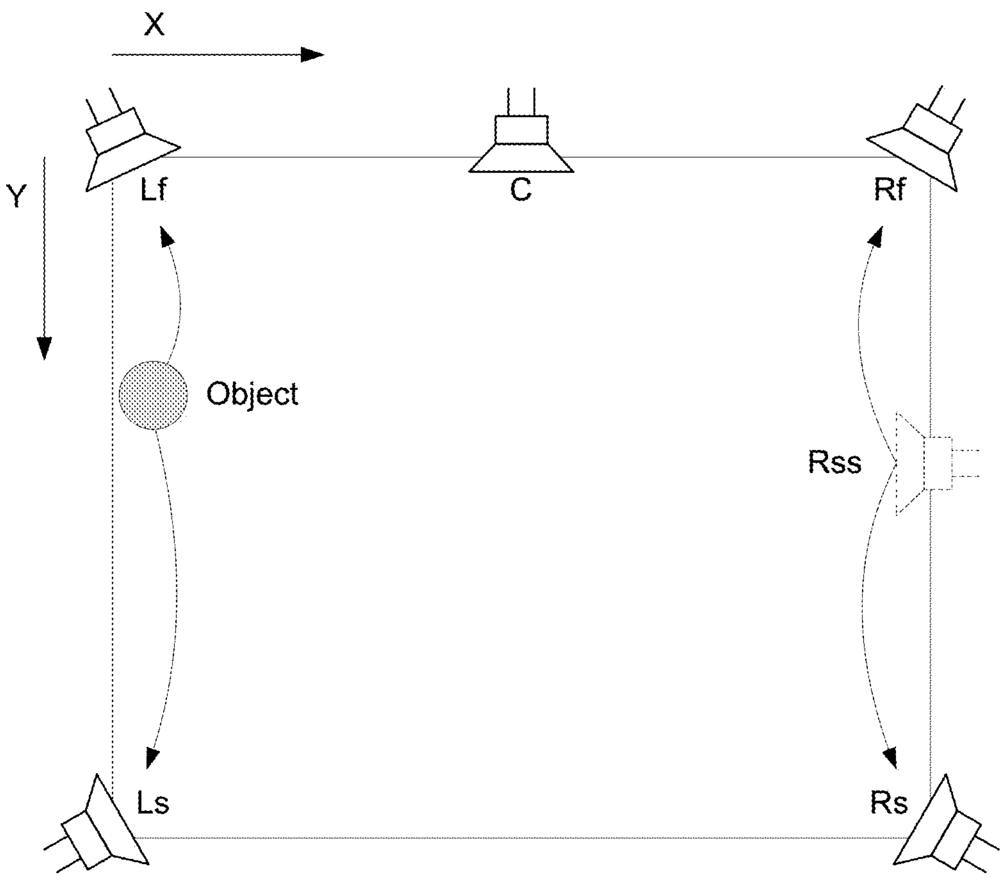
FIG. 1 is a schematic plan view of a prior art audio system illustrating how an audio object is represented as a phantom audio source between nearby loudspeakers.
Figure 2:
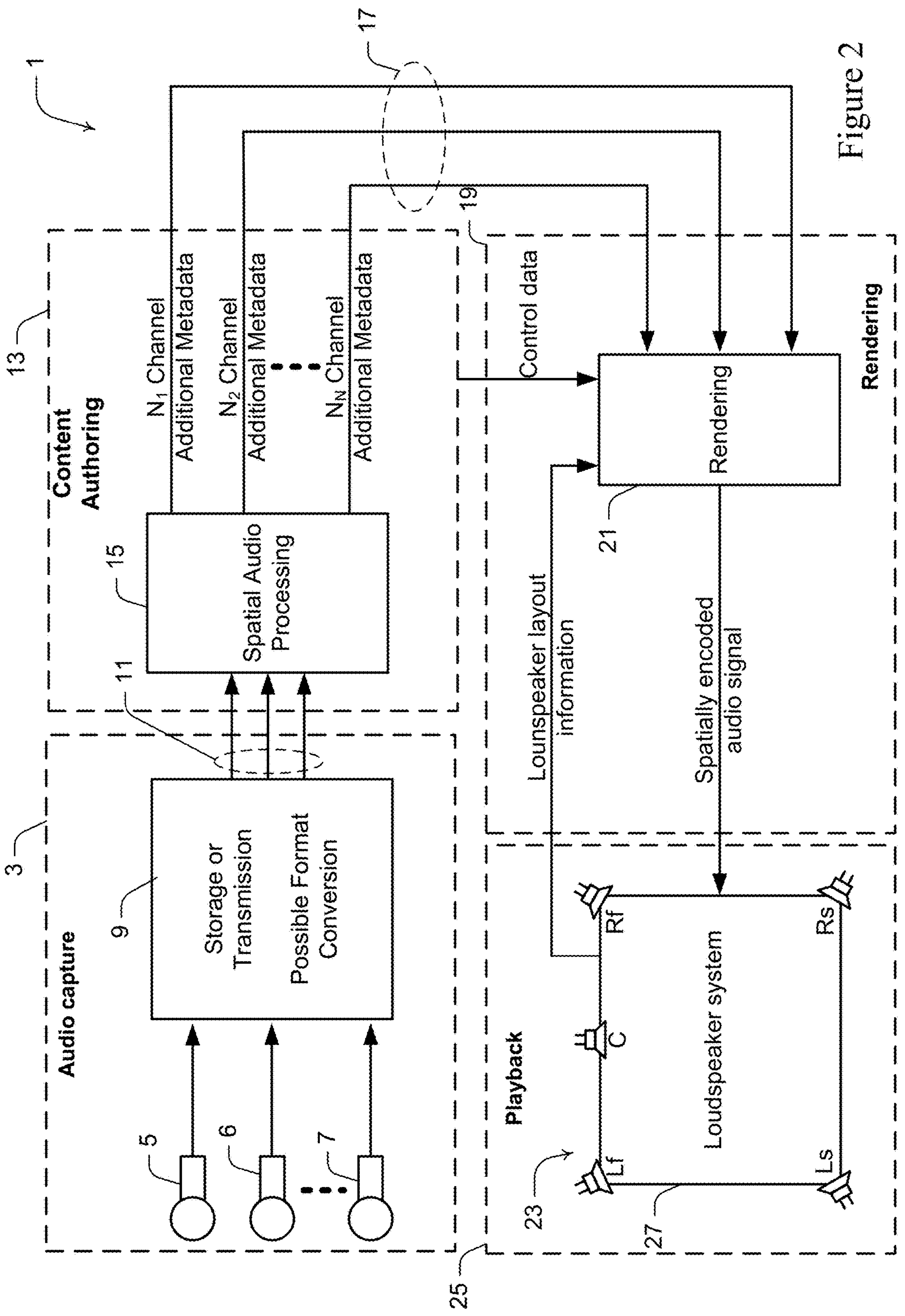
FIG. 2 is a functional view of an audio system illustrating the complete audio chain from audio capture through to audio playback.

The methodologies (described below) are adapted to be performed by one or more computer processors or dedicated rendering device in an object-based audio system such as the Dolby Atmos™ cinema or Dolby Atmos™ home system. A system-level overview of such an audio system from audio capture to audio playback is illustrated schematically in FIG. 2. System 1 includes an audio content capture subsystem 3 responsible for the initial capture of audio from an array of spatially separated microphones 5-7. Optional storage, processing and format conversion can also be applied at block 9. Additional mixing is also possible within some embodiments of subsystem 3. The output of capture subsystem 3 is a plurality of output audio channels 11 corresponding to the signals captured from each microphone. These channel signals are input to a content authoring subsystem 13, which, amongst other functions, performs spatial audio processing 15 to identify audio objects from the channel signals and determine position data corresponding to those audio objects. The output of spatial audio processing block 15 is a number of audio objects 17 having associated metadata. The metadata includes position data, which indicates the two-dimensional or three-dimensional position of the audio object in an audio environment (typically initially based on the environment in which the audio was captured), rendering constraints as well as content type (e.g. dialog, effects etc.). Depending on the implementation, the metadata may include other types of data, such as object width data, gain data, trajectory data, etc. Some audio objects may be static, whereas others may move through an audio scene. The number of output audio objects 17 may be greater, fewer or the same as the number of input channels 11. Although the outputs are designated as audio objects 17, it will be appreciated that, in some embodiments, the audio data associated with each audio object 17 includes data relating to more than one object source in the captured audio scene. For example, one object 17 may include audio data indicative of two different vehicles passing through the audio scene. Furthermore, a single object source from the captured audio scene may be present in more than one audio object 17. For example, audio data for a single person speaking may be encapsulated into two separate objects 17 to define a stereo object having two audio signals with metadata.

Objects 17 are able to be stored on non-transient media and distributed as data for various additional content authoring such as mixing, and subsequent rendering by an audio rendering subsystem 19.

At subsystem 19, rendering 21 is performed on objects 17 to facilitate representation and playback of the audio on a target loudspeaker system 23. Rendering 21 may be performed by a dedicated rendering tool or by a computer configured with software to perform audio rendering. The rendered signals are output to loudspeaker system 23 of a playback subsystem 25. Loudspeaker system 23 includes a predefined spatial layout of loudspeakers to reproduce the audio signal within an audio environment 27 defined by the loudspeaker system. Although five loudspeakers are illustrated in system 23, it will be appreciated that the methodologies described herein are applicable to a range of loudspeaker layouts including layouts with two surround loudspeakers (as illustrated), four surround loudspeakers or higher, height plane loudspeakers, etc., in addition to the front loudspeaker pair.

Audio object details may be authored or rendered according to the associated metadata which, among other things, may indicate the position of the audio object in a three-dimensional space at a given point in time. When audio objects are monitored or played back in a reproduction loudspeaker environment, the audio objects may be rendered according to the position metadata using the reproduction loudspeakers that are present in the reproduction environment, rather than being output to a predetermined physical channel, as is the case with traditional channel-based systems such as Dolby 5.1.x and Dolby 7.1.x systems.

Typically, the functions of the various subsystems are performed by separate hardware devices, often at separate locations. In some embodiments, additional processes are performed by the hardware of either subsystems including initial rendering at subsystem 13 and further signal manipulation at subsystem 19.

In alternative implementations, subsystem 13 may send only the metadata to subsystem 19 and subsystem 19 may receive audio from another source (e.g., via a pulse-code modulation (PCM) channel, via analog audio or over a computer network). In such implementations, subsystem 19 may be configured to group the audio data and metadata to form the audio objects.

The present invention is primarily concerned with the rendering 21 performed on objects 17 to facilitate playback of audio on loudspeaker system 23 that are independent of the recording system used to capture the audio data.

Method Overview

Figure 3:
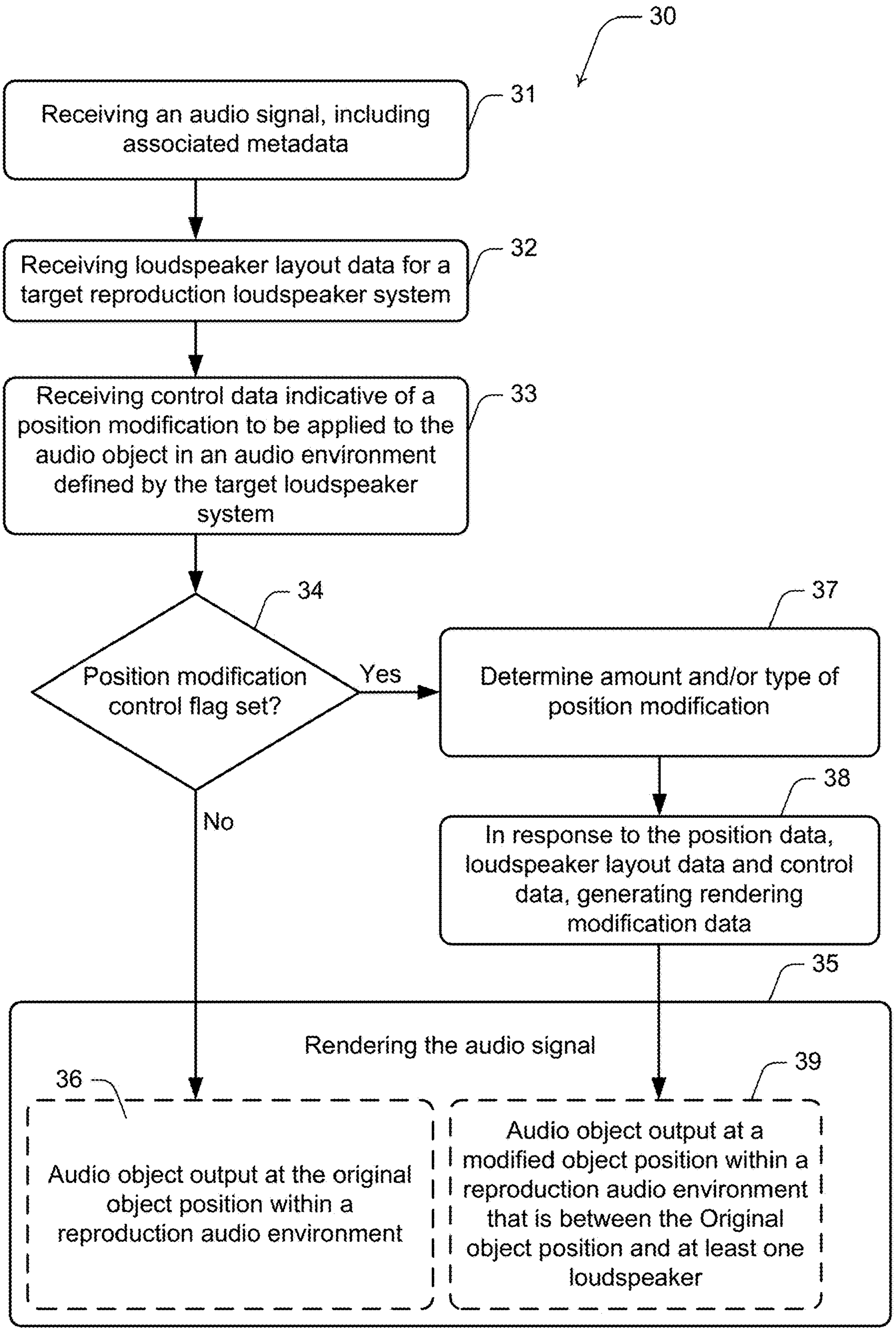
FIG. 3 is a process flow diagram illustrating the primary steps in a method of rendering an audio signal according to the present invention.

Referring to FIG. 3, there is illustrated a process flow diagram illustrating the primary steps in a method 30 of rendering an audio signal for a reproduction audio environment defined by a target loudspeaker system. Method 30 is adapted to be performed by a rendering device such as a dedicated rendering tool or a computer configured to perform a rendering operation. The operations of method 30 are not necessarily performed in the order shown. Moreover, method 30 (and other processes provided herein) may include more or fewer operations than those that are indicated in the drawings and/or described. Further, although method 30 is described herein as processing a single audio channel containing a single audio object, it will be appreciated that this description is for the purposes of simplifying the operation and method 30 is capable of being performed, simultaneously or sequentially, on a plurality of audio channels, each of which may include a plurality of audio objects.

Method 30 includes the initial step 31 of receiving the audio signal in the form of an audio object 17. As mentioned above, the audio signal includes audio data relating to an audio object and associated position metadata indicative of a position of the object within a defined audio environment. Initially, the audio environment is defined by the specific layout of microphones 5-7 used to capture the audio. However, this may be modified in the content authoring stage so that the audio environment differs from the initial defined environment. The position metadata includes coordinates of the object in the current audio environment. Depending on the environment, the coordinates may be two-dimensional or three-dimensional.

At step 32 loudspeaker layout data is received for the target loudspeaker system 23 for which the audio signal is to be reproduced. In some embodiments, the layout data is provided automatically from loudspeaker system 23 upon connection of a computer to system 23. In other embodiments, the layout data is input by a user through a user interface (not shown), or received from a system, either internal or external to the rendering subsystem, configured to perform an automated detection and calibration process for determining loudspeaker setup information, such as size, number, location, frequency response, etc. of loudspeakers.

At step 33, control data is received that is indicative of a position modification to be applied to the audio object in the reproduction audio environment during audio rendering process. The control data is specified during the content authoring stage and is received from an authoring device in the content authoring subsystem 13. In some embodiments, the control data is packaged into the metadata and sent in object 17. In other embodiments, the control data is transmitted from a content authoring device to a renderer separately to the audio channel.

The control data may be user specified or automatically generated. When user specified, the control data may include specifying a degree of position modification to perform and what type of position modification to perform. One manner of specifying a degree of position modification is to specify a preference to preserve audio timbre over the spatial accuracy of an audio object or vice versa. Such preservation would be achieved by imposing limitations on the position modification such that degradation to spatial accuracy is favored over degradation to audio timbre or vice versa. Generally, the greater the modification to the position of an audio object in the direction from an original object position towards a loudspeaker, the greater the audio timbre and the lesser the spatial object accuracy during playback. Thus, with no position modification applied, the spatial object accuracy is maximized. A maximum position modification, on the other hand, favors reproduction of the object by a single loudspeaker by increasing the panning gain of one loudspeaker, preferably one relatively close the object position indicated by the metadata, at the expense of reducing the panning gains of remote loudspeakers. Such change in effective panning gains, effectively increasing the dominance of one loudspeaker to reproduce the object, reduces the magnitude of comb-filter interactions perceived by the listener as a result of differences in the acoustical pathway length compared to the comb-filter interactions of the unmodified position, thereby thus improving the timbre of the perceived object, at the expense of a less accurate perceived position.

Further, the control data may be object specific or object independent. For example, in object-specific position modification, the control data may include data to apply a position modification to voice audio that is different to a modification applied to background audio. Further, the control data may specify a degree of position modification to be applied to the audio object during the rendering of the audio signal.

The control data also includes a position modification control flag which indicates that position modification should be performed. In some embodiments, the position modification flag is conditional based on the loudspeaker layout data. By way of example, the position modification flag may indicate that position modification is required for a speaker layout with only two surround speakers, while it should not be applied when the speaker layout has four surround speakers. At decision 34, it is determined whether the flag is set or not. If the flag is not set, no position modification is applied and, at step 35, rendering of the audio signal is performed based on the original position coordinates of the object. In this case, at block 36 the audio object is output at the original object position within the reproduction audio environment.

If, at decision 34, the position modification flag is set, the process proceeds to step 37 where a determination is made as to an amount and/or type of position modification to be applied during rendering. This determination is made based on control data specified during the content authoring stage and may be dependent upon user specified preferences and factors including the type of audio object, an audio overall scene in which the audio signal is to be played.

At step 38, rendering modification data is generated in response to the received object position data, loudspeaker layout data and control data (including the determination made in step 37 above). As will be described below, this rendering modification data and the method of modifying the object position can take a number of different forms. In some embodiments, steps 37 and 38 are performed together as a single process. Finally, at step 35, rendering of the audio signal is performed with the rendering modification data. In this case, at block 39 the audio signal is output with the audio object at a modified object position that is between loudspeakers within the reproduction audio environment. For example, the modified object position may be a position nearer to one or more loudspeakers in the audio environment than the original object position or may be a position nearer to a closest loudspeaker in the audio environment relative to the original object position. In some embodiments, the modified object position can be made to be equal to a specific loudspeaker such that the entire audio signal corresponding to that audio object is produced from that single loudspeaker.

The rendering modification data is applied as a rendering constraint during the rendering process. The effect of the rendering modification data is to modify a drive signal for one or more of the loudspeakers within loudspeaker system 23 by modifying their respective panning gains as a function of time. This results in the audio object appearing to originate from a source location different to that of its original intended position.

As mentioned above, to reproduce the audio signal each loudspeaker is driven with a drive signal s(t) which is a combination of a time varying panning gain g(t) and a time varying object audio signal x(t). That is, for a single loudspeaker and a single audio object:

$$s(t)=g(t)x(t) \quad \text{(Eq 6)}$$

More generally, for a plurality of audio objects represented across a plurality of loudspeakers, the rendered audio signal is expressed by equation 1. Thus, a loudspeaker drive signal is modified by modifying the panning gain applied to that loudspeaker. The panning gain applied to an individual speaker is expressed as a predefined panning law $\mathcal{F}$, which is dependent upon the loudspeaker layout data P and object position metadata M(t). That is:

$$g(t)=\mathcal{F}(P, M(t)) \quad \text{(Eq 7)}$$

The loudspeaker layout data P is represented in the same coordinate system as the audio object position metadata M(t). Thus, in a 5 loudspeaker Dolby 5.1 system, includes coordinates for the five loudspeakers.

From equation 7 it can be seen that modification of the panning gain requires modification of one or more of the position metadata M(t), loudspeaker layout data P or the panning law $\mathcal{F}$ itself. A decision as to which parameter to vary is based upon a number of factors including the type of audio object to be rendered (voice, music, background effects etc), the original position of the audio object relative to the loudspeaker positions and the number of loudspeakers. This decision is made in steps 37 and 38 of method 30. Typically, there is a preference to modify the position metadata or loudspeaker layout data over modifying the panning law itself.

In one embodiment, the amount of position modification to be applied is dependent upon the target speaker layout data. By way of example, a position modification applied to a loudspeaker system having two surround loudspeakers is larger than a position modification applied to a loudspeaker system having four surround loudspeakers.

The flexible control of these three factors permits the continuous mapping of an audio object position from its original intended position to another position anywhere within the reproduction audio environment. For example, an audio object moving in a smooth trajectory through the audio environment can be mapped to move in a modified but similarly smooth trajectory.

Of particular importance is the ability to reposition an audio object in the front-rear direction of the reproduction audio environment, which is otherwise difficult to achieve without significant loss to signal timbre or spatial object position accuracy.

The flexibility described above permits a number of different position modification routines to be performed. In particular, the option is provided to trade off audio timbre or the size of a listener's 'sweet spot' with the accuracy of the spatial intent of the audio object, or vice versa. If a preference for timbre is provided, the sweet spot within which a listener can hear an accurate reproduction of the audio signal is enhanced. However, if a preference for accuracy of spatial object intent, then the timbre and sweet spot size is traded off for more accurate object position reproduction in the rendered audio. In the latter case, ideally the rendering is performed such that an azimuth angle of the audio object between the object position and modified object position from the perspective of a listener is substantially unchanged so that the perceived object position (from a listener's perspective) remains essentially the same.

Clamping

Figure 4:
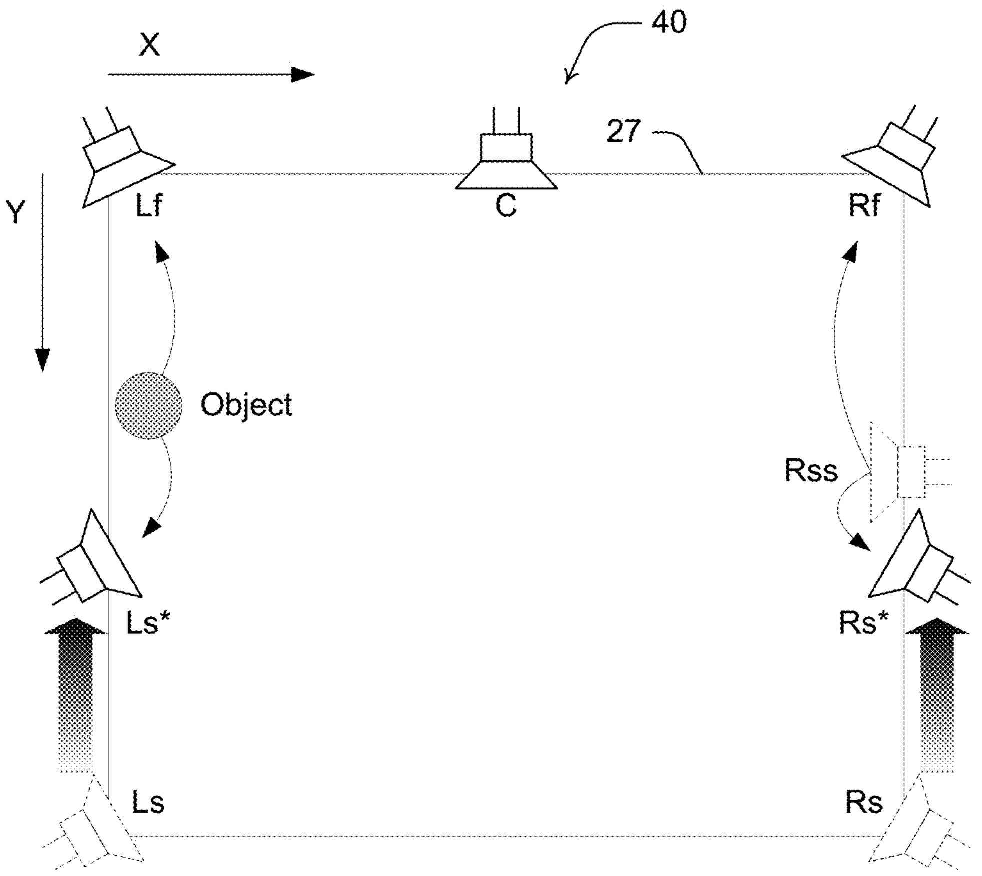
FIG. 4 is a schematic plan view of a five loudspeaker system 40 being driven with six audio channels to illustrate an audio clamping process.

A first position modification routine that can be performed is referred to as 'clamping'. In this routine, the rendering modification data determines an effective position of the rear loudspeaker pairs in the reproduction audio environment in terms of their y coordinate (or front-rear position) depending on the loudspeaker layout. As a result, during rendering the perceived loudspeaker layout is clamped into a smaller sized arrangement. This process is illustrated in FIG. 4, which illustrates a five loudspeaker system 40 but being driven with six audio channels (the 'Rss' channel having no corresponding loudspeaker). System 40 defines reproduction audio environment 27.

The original position of surround loudspeakers 'Ls' and 'Rs' is modified within the audio environment 27 resulting in modified positions 'Ls*', 'Rs*'. The magnitude of the displacement is controlled by the control data and is dependent upon the original object position (in the front-rear direction) and the loudspeaker layout. The result of modifying the positions of 'Ls' and 'Rs' is that the new positions 'Ls*' and 'Rs*' are much closer to the audio object and the right side surround 'Rss' audio channel (which has no corresponding loudspeaker). Mathematically, this transformation is performed by modifying P in equation 7.

As a result, the panning gains of these channels for loudspeakers 'Ls*' and 'Rs*' will increase, and hence comb-filter artifacts will generally reduce. This improved timbre comes at the cost of a displacement of the perceived location of the audio object and/or 'Rss' channel, because the actual location of the physical loudspeakers is not being modified, and hence the perceived location of the object and 'Rss' will move backwards and the object position accuracy decreases during playback. A second consequence is that moving audio objects having a time varying trajectory through audio environment 27 involving changes in Y coordinate beyond the y coordinate of 'Ls*' or 'Rs*' will not have an effect and therefore object trajectories may become discontinuous over time.

Figure 5:
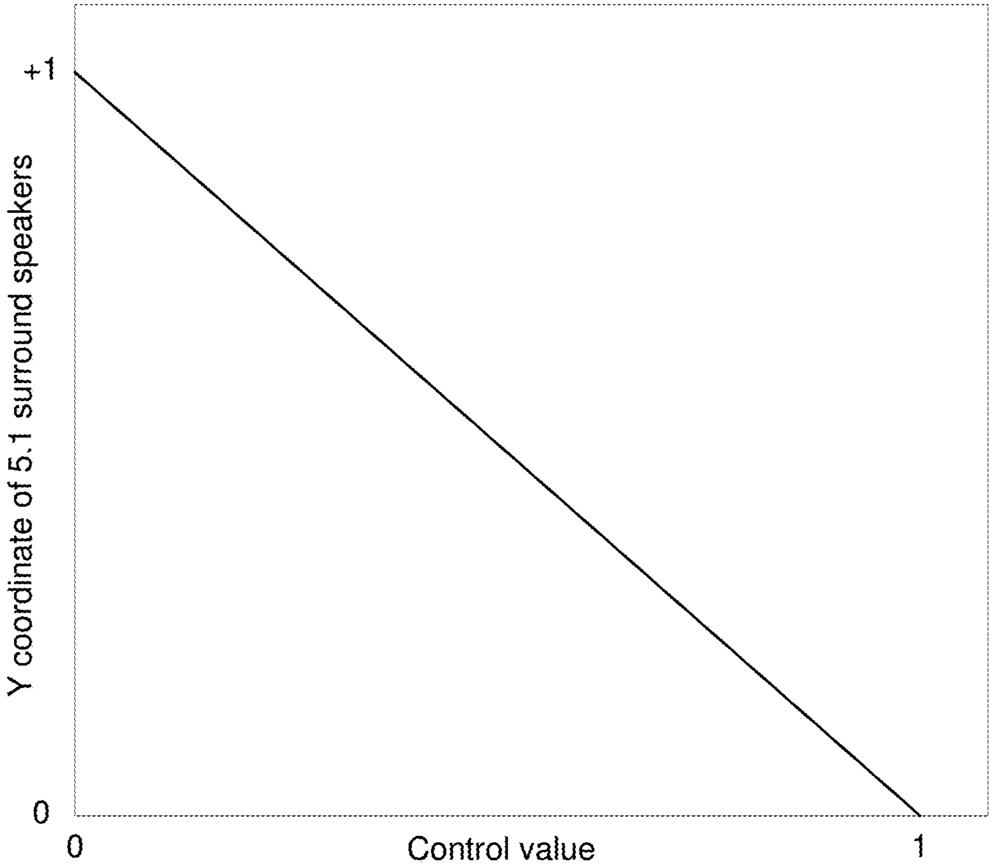
FIG. 5 is a graph of a control curve illustrating an exemplary relationship between a control value and a Y coordinate of a surround sound loudspeaker system.

As one example, the Y coordinate of the surround loudspeakers (that is, a Y value of P in equation 7) is controlled by one or more of the object position metadata and control data, provided that the target loudspeaker setup has only two surround loudspeakers (such as a Dolby 5.1.x setup). This control results in a dependency curve such as that illustrated in FIG. 5. The ordinate gives the Y coordinate of the surround loudspeakers, while the abscissa reflects the (normalized) control value (determined from object position metadata and received control data). By way of example, an object position may be at a normalized position of 0.6 in the Y axis and the control data may permit a 50% modification to the speaker layout. This would result in a modification of the Y coordinate of the surround speakers from a position of 1.0 to 0.8. Alternatively, if the control data permits a 100% modification, then the Y coordinate of the surround speakers would be modified from a position of 1.0 to 0.6. The output of this calculation is the rendering modification data which is applied during the rendering of the audio signal.

For the above example, the clamping process would be applied only when two surround loudspeakers are provided, and would not be applied when 'Lss' and 'Rss' (side surround) loudspeakers are available. Hence the modification of loudspeaker positions is dependent on the target loudspeaker layout, object position and the control data.

Generally speaking, methods referred to above as Clamping may include a manipulation (modification) of the (real) loudspeaker layout data (relating to an audio environment) wherein generating a modified speaker drive signal is based on the modified loudspeaker layout data, resulting in a modified object position. During rendering of an audio object, a rendering system may thus make use of modified loudspeaker layout data which is not corresponding to the real layout of loudspeakers in the audio environment. The loudspeaker layout data may be based on the positions of the loudspeakers in the audio environment. The modified loudspeaker layout data do not correspond to the positions of the loudspeakers in the audio environment.

Warping

Figure 6:
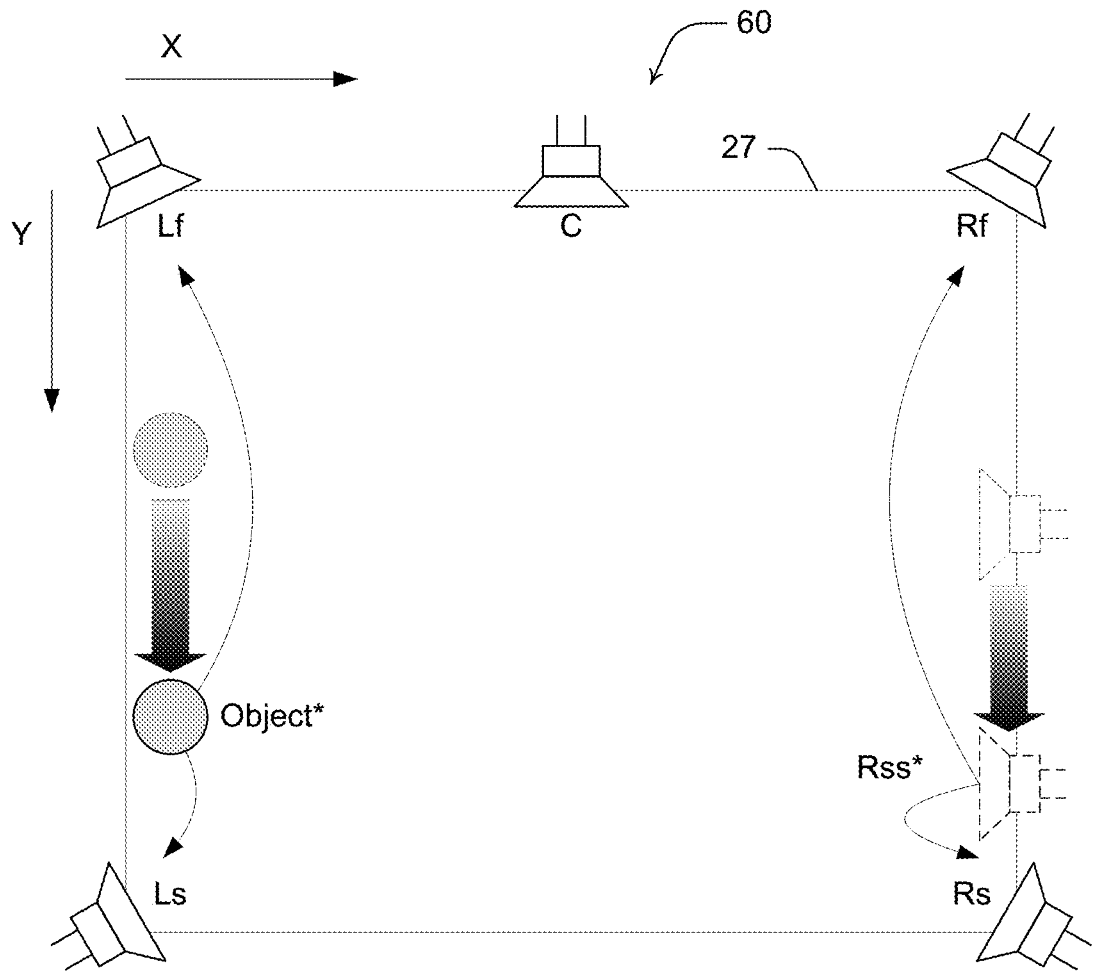
FIG. 6 is a schematic plan view of a five loudspeaker system 60 being driven with six audio channels to illustrate an audio warping process.

A similar effect to clamping, referred to as 'warping', can be obtained by modifying or warping Y coordinates of the audio object depending on (1) the target loudspeaker layout, and (2) the control data. This warping process is depicted in FIG. 6, which illustrates loudspeaker system 60. In this warping procedure, the Y coordinate values of objects are modified prior to calculating panning gains for the loudspeakers. As shown in FIG. 6, the Y coordinates are increased (i.e. audio objects are moved towards the rear of audio environment 27) to increase their amplitude panning gains for the surround loudspeakers.

Figure 7:
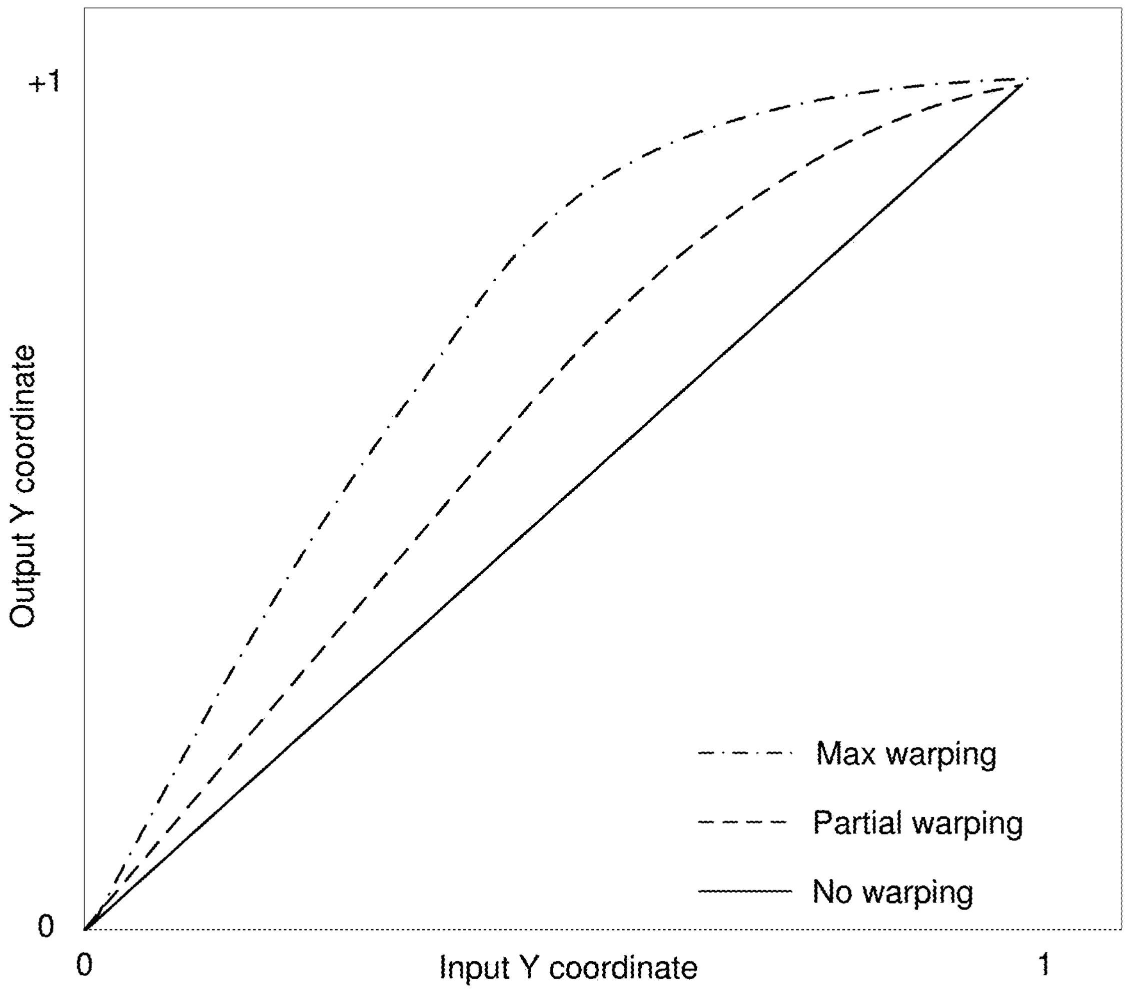
FIG. 7 is a graph of exemplary warping curves applied in a warping process.

Exemplary warping functions are shown in FIG. 7. The warping functions map an input object position to an output modified object position for various amounts of warping. Which curve is to be employed is controlled by the control data. Note that the illustrated warping functions are exemplary only and; in principle, substantially any input-output function can be applied, including piece-wise linear functions, trigonometric functions, polynomials, spline functions, and the like. Furthermore, instead of, or in addition to, control data indicating one of a number of pre-defined warping functions to use, warping may be controlled by control data indicating a degree and/or type of interpolation to be applied between two pre-defined warping functions (e.g., no warping and max warping of FIG. 7). Such control data may be provided as metadata, and/or determined by a user through, e.g., a user interface.

In the previous sections, coordinate warping was discussed in the context of processing Y coordinates. In general sense, all object coordinates can be processed by some function that (1) depends on provided position metadata, (2) is conditional upon the target loudspeaker setup and (3) is constrained by the control data. Warping of Y coordinates for Dolby 5.1 loudspeaker systems is, in this context, one specific embodiment of a generic function:

$$M_j'(t) = H(P, M_j(t), C_j(t)), \qquad \text{(Eq 8)}$$

with H a coordinate processing function, $M_j$ the object position metadata, $C_j$ the warping metadata, P indicates the target loudspeaker setup, and $M'_j$ denoting the processed audio object position metadata for object j that are used to compute panning gains $g_{i,j}$ as in equations 3 or 7.

In alternative formulation, the panning gain function can be expressed as follows:

$$g_{i,j}(t)=\mathcal{F}(P,M_j'(t))=\mathcal{F}(P,M_j(t),C_j(t)). \quad \text{(Eq 9)}$$

In this formulation, the modified position metadata $M'_j$ is used to produce panning gains for loudspeaker setup P and warping metadata $C_j$.

In addition to simply modifying Y coordinates as described in the previous sections, other types of position modification are possible.

Figure 8:
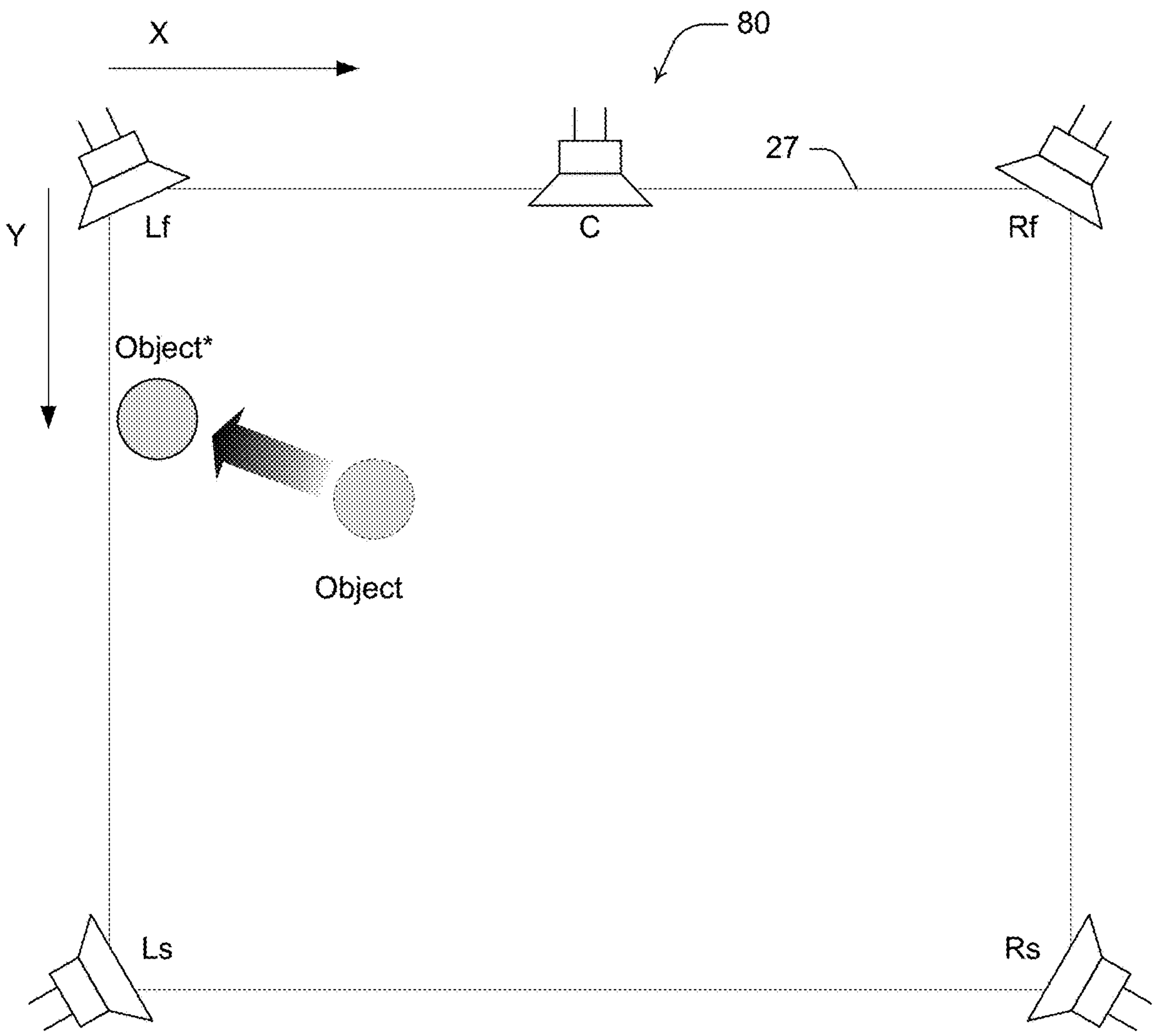
FIG. 8 a schematic plan view of a five loudspeaker system 80 illustrating an audio modification process to bring an object closer to a loudspeaker position.

In a first alternative position modification arrangement, generic warping of coordinates is performed to move audio objects in two or three dimensions towards the corners or walls of the audio reproduction environment. In general, if the number of available loudspeakers is small (such as in a Dolby 5.1 rendering setup), it can be beneficial to modify audio object position metadata in such a way that the modified position is closer to the walls or the corners of the audio environment. An example of such a modification process is illustrated in FIG. 8 in loudspeaker system 80. Here an appropriate warping function modifies the audio object position coordinates in such a way that the modified object position is closer to a side and/or corner of the environment. In one embodiment, this process is applied such that the object's azimuth angle, as seen from the listener's position, is essentially unchanged. Although the example in FIG. 8 is applied in a 2-dimensional plane, the same concept can be equivalently applied in 3-dimensions.

Another alternative position modification arrangement includes performing generic warping of position coordinates to move object positions closer to the actual loudspeaker positions or a nearest loudspeaker position. In this embodiment, the warping functions are designed such that the object is moved in two or three dimensions towards the closest loudspeaker based on the distance between the object and its nearest neighbor loudspeaker location.

Generally speaking, methods referred to above as Warping may include modifying object position data by moving the object towards the rear side of an audio environment and/or by moving the object closer to an actual loudspeaker position in the audio environment and/or by moving the object closer to a side boundary and/or a corner of the audio environment. Side boundaries and corners of the audio environment may thereby be defined by loudspeaker layout data based on the positions of the loudspeakers in the audio environment.

Specifying Control Data During Audio Content Authoring

As mentioned above, in some embodiments the control data which constrains the position modification during rendering can be received from a content authoring system or apparatus. Accordingly, referring to FIG. 9, one aspect of the invention relates to an audio content creation system 90. System 90 includes an input 92 for receiving audio data 94 from one or more audio input devices 96. The audio data includes data indicative of one or more audio objects. Example input devices include microphones generating raw audio data or databases of stored pre-captured audio. An audio processing module 98 processes the audio data and, in response, generates an audio signal 100 having associated metadata including object position data indicative of a spatial position of the one or more audio objects. The audio signal 100 may include single or plural audio channels. The position data is specified in coordinates of a predefined audio environment, which may be the environment in which the audio data was captured or an environment of an intended playback system. Module 98 is configured to perform spatial audio analysis to extract the object metadata and also to perform various other audio content authoring routines. A user interface 102 allows users to provide input to the content authoring of the audio data.

System 90 includes a control module 104 configured to generate rendering control data to control the performing of audio object position modification to be performed on the audio signal during rendering of that signal in an audio reproduction environment. The rendering control data is indicative of the control data referred to above in relation to the rendering process. Module 104 is configured to perform automatic generation of rendering control data based on the metadata. Module 104 is also able to receive user input from interface 102 for receiving user preferences to the rendering modification and other user control. The object position modification may be dependent upon a type of audio object identified in the audio data.

The rendering control data is adapted to perform a number of functions, including:

- Providing an instruction to perform audio object position modification on a subset or each of the audio objects identified within the audio data. That is, whether or not to perform position modification during subsequent audio rendering. This is received at a rendering device as the position modification control flag in step 34 of method 30.
- Determining a type of object position modification to be performed during rendering. For example, a clamping operation may be preferred over a warping operation or vice versa.
- Determining a degree of object position modification to be applied to the one or more audio objects. The user may wish to allow full modification of the object position or partial position modification. The degree of position modification to be applied inherently controls the trade off between audio timbre and spatial object accuracy. If no position modification is applied, the spatial object accuracy is preserved at the expense of audio timbre. If full position modification is applied, the spatial object accuracy is compromised to preserve audio timbre.

The rendering control data is attached to the metadata and output as part of the output audio signal 106 through output 108. Alternatively, the rendering control data may be sent separate to the audio signal.

Figure 9:
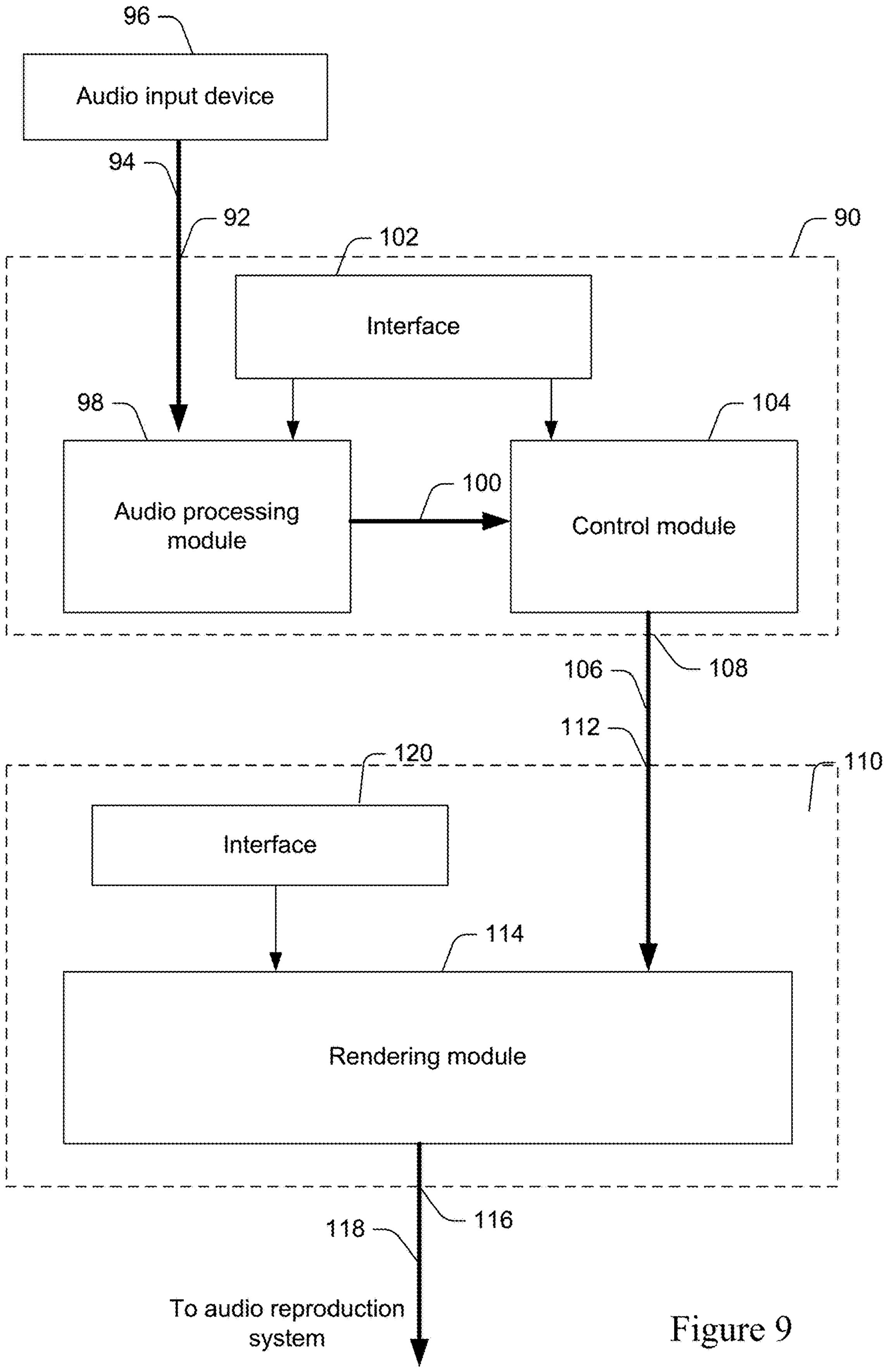
FIG. 9 is a functional view of an audio content creation system in communication with an audio rendering system.

The audio signal output from system 90 is transmitted (directly or indirectly) to a rendering system for subsequent rendering of the signal. Referring still to FIG. 9, another aspect of the invention relates to an audio rendering system 110 for rendering audio signals including the rendering control data. System 110 includes an input 112 configured to receive audio signal 106 including the rendering control data. System 110 also includes a rendering module 114 configured to render the audio signal based on the rendering control data. Module 114 outputs a rendered audio signal 116 through output 118 to a reproduction audio environment where the audio objects are reproduced at respective modified object positions within the reproduction audio environment. Preferably, the modified object positions are between the positions of the loudspeakers in the reproduction audio environment. A user interface 120 is provided for allowing user input such as specification of a desired loudspeaker layout, control of clamping/warping, etc.

As such, systems 90 and 110 are configured to work together to provide a full audio processing system which provides for authoring audio content and embedding selected rendering control for selectively modifying the spatial position of objects within an audio reproduction environment. The present invention is particularly adapted for use in a Dolby Atmos™ audio system.

Audio content authoring system 90 and rendering system 110 are able to be realized as dedicated hardware devices or may be created from existing computer hardware through the installation of appropriate software.

Conclusions

It will be appreciated that the above described invention provides significant methods and systems for providing spatial position modification of audio objects during rendering of an audio signal.

The invention allows a mixing engineer to provide a controllable trade-off between spatial object position intent and timbre of dynamic and static objects within an audio signal. In one extreme case, spatial intent is maintained to the full extent, at the cost of a small sweet spot and timbre degradation due to (position-dependent) comb-filter problems. The other extreme case is optimal timbre and a large sweet spot by reducing or eliminating the application of phantom imaging, at the expense of a modification of the perceived position of audio objects. These two extreme cases and intermediate scenarios can be controlled by adding dedicated control metadata alongside with audio content that controls how a renderer should render content.

Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (e.g., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

REFERENCES

1. Breebaart, J. (2013). *Comparison of interaural intensity differences evoked by real and phantom sources*, J. Audio Eng. Soc. 61 (11), 850-859.

2. V. Pulkki (2002), *Compensating displacement of amplitude-panned virtual sources*, Audio Engineering Society 22th Int. Conf. on Virtual, Synthetic and Entertainment Audio pp. 186-195, Espoo, Finland.

3. ITU-R, recommendation BS.1116-1 (1997), *Methods for the subjective assessment of small impairments in audio systems including multichannel sound systems*, Intern. Telecom Union: Geneva, Switzerland.

What is claimed is:

1. A method of rendering an audio signal comprising a position of an audio object at a given point in time, and object rendering control data relating to a position modification to be applied to the audio object in an audio environment, the method comprising:

receiving the position of the audio object;

receiving from an interface input regarding loudspeaker layout data for a target loudspeaker system;

receiving the object rendering control data indicative of the position modification to be applied, at the given point in time, to the audio object in the audio environment; and rendering the audio object, at the given point in time, based on the position of the audio object, the loudspeaker layout data, and the object rendering control data, to output the audio object, at the given point in time, at a modified object position, wherein the object rendering control data determines a degree of position modification to be applied, at the given point in time, to the audio object during the rendering of the audio signal, wherein the modified object position, at the given point in time, is a position nearer to a closest loudspeaker in the audio environment relative to the position of the audio object.

2. The method according to claim 1, wherein each loudspeaker in the target loudspeaker system is driven, at the given point in time, with a drive signal, and a modified drive signal, at the given point in time, is determined for one or more of the loudspeakers.

3. The method according to claim 2, wherein the drive signal is a function of the object position data, and the modified drive signal, at the given point in time.

4. The method according to claim 2, wherein the drive signal is a function of the loudspeaker layout data, and the modified drive signal, at the given point in time, is generated by manipulating the loudspeaker layout data such that the modified drive signal, at the given point in time, is a function of the manipulated loudspeaker layout data, or wherein the drive signal is a function of a panning law, and the modified drive signal, at the given point in time, is generated by modifying the panning law.

5. The method according to claim 1, wherein the modified object position is obtained by moving, at the given point in time, the position of the audio object in a front-to-rear direction within the audio environment.

6. The method according to claim 1, wherein the rendering is performed such that an azimuth angle, at the given point in time, of the audio object between the position of the audio object and the modified object position from a perspective of a listener is substantially unchanged.

7. The method according to claim 1, wherein the object rendering control data is generated during an authoring of the audio signal.

8. The method according to claim 1, wherein the loudspeaker layout data includes data indicative of either two or four surround loudspeakers.

9. A non-transitory carrier medium carrying computer executable code that, when executed on a processor, causes the processor to perform a method according to claim 1.

* * * * *